US011252667B2

(12) United States Patent
Yao et al.

(10) Patent No.: US 11,252,667 B2
(45) Date of Patent: Feb. 15, 2022

(54) CONTROL INFORMATION TRANSMISSION METHOD AND APPARATUS

(71) Applicant: XI'AN ZHONGXING NEW SOFTWARE CO., LTD., Xi'an (CN)

(72) Inventors: Ke Yao, Shenzhen (CN); Nan Li, Shenzhen (CN); Bo Sun, Shenzhen (CN); Xuelin Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/347,391

(22) PCT Filed: Sep. 13, 2017

(86) PCT No.: PCT/CN2017/101618
§ 371 (c)(1),
(2) Date: May 3, 2019

(87) PCT Pub. No.: WO2018/082402
PCT Pub. Date: May 11, 2018

(65) Prior Publication Data
US 2020/0053649 A1 Feb. 13, 2020

(30) Foreign Application Priority Data

Nov. 4, 2016 (CN) .................. 201610966243.X

(51) Int. Cl.
H04W 52/02 (2009.01)
H04W 76/28 (2018.01)
(Continued)

(52) U.S. Cl.
CPC ... H04W 52/0235 (2013.01); H04W 72/0406 (2013.01); H04W 76/27 (2018.02); H04W 76/28 (2018.02); H04W 84/12 (2013.01)

(58) Field of Classification Search
CPC ............ Y02D 30/70; H04W 52/0235; H04W 52/0229; H04W 52/02; H04W 52/0219; H04W 76/27; H04W 76/28; H04W 40/005
See application file for complete search history.

(56) References Cited

U.S. PATENT DOCUMENTS

2004/0151147 A1   8/2004   Huckins
2007/0076683 A1   4/2007   Chung et al.
(Continued)

FOREIGN PATENT DOCUMENTS

CN   1745544 A   3/2006
CN   1960365 A   5/2007
(Continued)

OTHER PUBLICATIONS

Office Action of corresponding Chinese Patent Application No. 201610966243.X and its English Translation—13 pages (dated Mar. 9, 2020).
(Continued)

Primary Examiner — Elton Williams
(74) Attorney, Agent, or Firm — Knobbe, Martens, Olson & Bear, LLP

(57) ABSTRACT

A control information transmission method includes that: a first station sends a wireless signal including control information, where the control information is used for instructing a specified second station in a sleep state to perform one or more of following operations: state update, sleep mode transition, leaving the sleep state, and an operation after leaving the sleep state. A secondary module of the second station receives and decodes a wake-up signal to obtain control information and identity identifier information, and sends the control information and the identity identifier information to a control module; and the control module of the second station determines, according to the identity (Continued)

identifier information, whether the second station is a target second station of the wake-up signal, and parses and completes an operation indicated in the control information.

16 Claims, 4 Drawing Sheets

(51) Int. Cl.
*H04W 76/27* (2018.01)
*H04W 72/04* (2009.01)
*H04W 84/12* (2009.01)

(56) References Cited

U.S. PATENT DOCUMENTS

| | | | |
|---|---|---|---|
| 2010/0150042 A1* | 6/2010 | Oh | H04W 52/0235 370/311 |
| 2010/0165897 A1 | 7/2010 | Sood | |
| 2010/0304780 A1 | 12/2010 | Chung et al. | |
| 2013/0311809 A1 | 11/2013 | Sood | |
| 2014/0112224 A1* | 4/2014 | Jafarian | H04W 52/0209 370/311 |
| 2015/0139056 A1* | 5/2015 | Wang | H04W 48/12 370/311 |
| 2016/0077573 A1 | 3/2016 | Lee et al. | |
| 2017/0171811 A1 | 6/2017 | Xing | |
| 2018/0020501 A1* | 1/2018 | Aboul-Magd | H04W 76/28 |
| 2019/0159127 A1* | 5/2019 | Son | H04W 52/0216 |

FOREIGN PATENT DOCUMENTS

| | | |
|---|---|---|
| CN | 101626613 A | 1/2010 |
| CN | 104737597 A | 6/2015 |
| CN | 104756560 A | 7/2015 |
| CN | 105430758 A | 3/2016 |
| CN | 105578577 A | 5/2016 |
| CN | 105940722 A | 9/2016 |
| CN | 105960000 A | 9/2016 |

OTHER PUBLICATIONS

International Search Report dated Dec. 1, 2018 for International Application No. PCT/CN2017/101618, 5 pages.
Written Opinion of the International Searching Authority dated Dec. 1, 2018 for International Application No. PCT/CN2017/101618, 3 pages.
First Search Report received in CN Application No. 201610966243X, dated Feb. 27, 2020.
Supplemental Search Report received in CN Application No. 201610966243X, dated Sep. 28, 2020.
Second Office Action received in CN Application No. 201610966243X, dated Oct. 12, 2020.

* cited by examiner

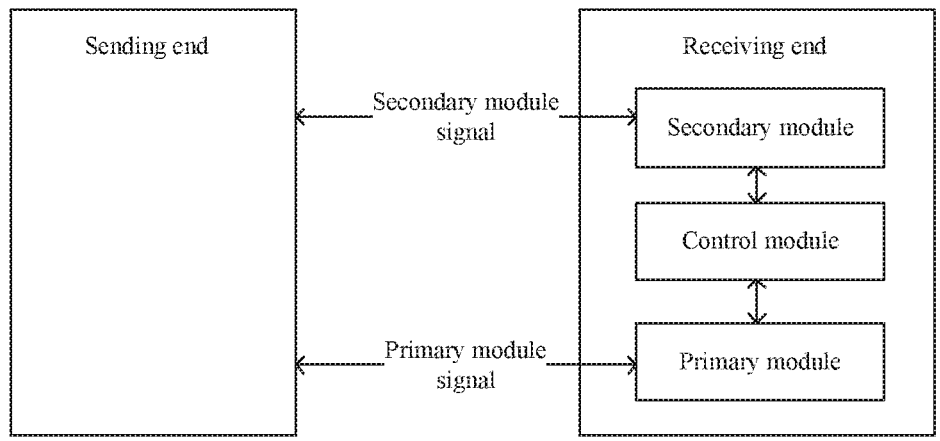

A first station sends a wireless signal including control information, where the control information is used for instructing a specified second station in a sleep state to perform one or more of following operations: state update, sleep mode transition, leaving the sleep state, and an operation after leaving the sleep state A second station receives the wireless signal

A secondary module of a second station receives and decodes a wake-up signal, and sends decoded control information and identity identifier information to a control module

302

The control module of the second station determines, according to the identity identifier information, whether the second station is a target second station of the wake-up signal, and parses and completes an operation indicated in the control information

FIG. 3

ND APPARATUS

I. CROSS-REFERENCE TO RELATED APPLICATIONS

This is a National Phase Application, filed under 35 U.S.C. 371, of International Patent Application No. PCT/CN2017/101618, filed on Sep. 13, 2017, which claims priority to Chinese patent application No. 201610966243.X filed on Nov. 4, 2016, contents of each of which are incorporated herein by reference in their entireties.

TECHNICAL FIELD

The present application relates to, but is not limited to, the technical field of wireless communications and, in particular, relates to a control information transmission method and apparatus.

BACKGROUND

In wireless communication systems, power saving performance has always been valued. With the development of the Internet of Things (IoT), a variety of applications have brought a large number of self-powered devices to access the wireless network. Due to the large number of devices or due to the limitations of the application environment, it is not feasible to change batteries or charge frequently, so it is necessary to put forward higher power saving requirements for the design of such applications and devices.

Traditional wireless local area networks (WLAN) systems and cellular network systems have corresponding power saving mechanisms. When no communication needs to be performed, the terminal device enters a sleep state and wakes up to receive information at a predetermined time.

The power saving mechanism supported in the traditional WLAN for users is as follows: a power saving user and an access point agree on a listening interval of the power saving user. When the power saving user is in the sleep state and the access point has data to be sent to the user, the user is notified through indication information in a beacon frame; and the power saving user wakes up only at the agreed time to listen to the beacon frame and parse the indication information to learn whether any data for the power saving user exists. The listening interval is generally set to hundreds of milliseconds.

A power saving mechanism of the cellular network system is similar to that of the WLAN. In the radio resource control (RRC) connected state, a discontinuous reception (DRX) mechanism exists, and the power saving user and the base station agree on sleep time and wake-up time. If the base station needs to send data to the power saving user, the data can only be sent at the agreed wake-up time of the user. In the RRC idle state, the power saving user periodically wakes up to listen to a paging message, and both the serving base station and the non-serving base station need to send the paging message at a specific moment to contact with the power saving user.

In the 802.11ah of the Institute of Electrical and Electronics Engineers (IEEE), the power saving characteristics of sensor-type devices has been improved. Power saving users may decide the wake-up time and may wake up to actively send information to the access point so as to obtain the data of the user cached in the access point. Although the user does not need to wake up periodically under this mechanism, the user must wake up at least once in a certain period of time to actively query whether any data of the user exists on the access point.

In order to further improve the power saving performance of the terminal device, it is necessary to propose a mechanism in which the terminal does not need to wake up periodically when no communication needs to be performed. One way is to add a low-power-consumption module to the original communication system (hereinafter referred to as the primary module). When no communication needs to be performed, the primary module saves power to the greatest extent (the primary module is in a deep sleep state or is turned off), and only the low-power-consumption module is responsible for listening to a channel. A relevant signal is sent to the low-power-consumption module only when other devices have a demand to communicate with the primary module, and the low-power-consumption module then triggers the primary module to enter a working state to complete communication with other devices. In practical applications, such type of device has the demand to move across cells.

In practical applications, such type of device has the demand to move across cells, and currently no solution exists for such mobile demand.

SUMMARY

A summary of the subject matter is described hereinafter in detail. This summary is not intended to limit the scope of the claims.

A control information transmission method and apparatus is provided in the embodiments of the present application.

In a first aspect, a control information transmission method is provided in the embodiments of the present application and includes a step described below.

A first station sends a wireless signal including control information. The control information is used for instructing a specified second station in a sleep state to perform one or more of following operations: state update, sleep mode transition, leaving the sleep state, and an operation after leaving the sleep state.

In a second aspect, a control information transmission method is provided in the embodiments of the present application and includes steps described below.

A secondary module of a second station receives and decodes a wake-up signal to obtain control information and identity identifier information, and sends the control information and the identity identifier information to a control module.

The control module of the second station determines, according to the identity identifier information, whether the second station is a target second station of the wake-up signal, and parses and completes an operation indicated in the control information.

In a third aspect, a control information transmission apparatus is provided in the embodiments of the present application. The control information transmission apparatus is applied to a first station and includes a communication module.

The communication module is configured to send a wireless signal comprising control information. The control information is used for instructing a specified second station in a sleep state to perform one or more of following operations: state update, sleep mode transition, leaving the sleep state, and an operation after leaving the sleep state.

In a fourth aspect, a control information transmission apparatus is provided in the embodiments of the present application. The control information transmission apparatus is applied to a second station and includes a secondary module and a control module.

The secondary module is configured to receive and decode a wake-up signal to obtain control information and identity identifier information, and send the control information and the identity identifier information to a control module.

The control module is configured to determine, according to the identity identifier information, whether the second station is a target second station of the wake-up signal, and parse and complete an operation indicated in the control information.

In addition, a computer-readable medium is further provided in the embodiments of the present application. The computer-readable medium is configured to store transmission programs of control information. When executed by a processor, the transmission programs implement the steps of the control information transmission method provided in the first aspect or the second aspect.

In the embodiments of the present application, the first station sends the wireless signal including the control information. The control information is used for instructing the specified second station in the sleep state to perform one or more of the following operations: state update, sleep mode transition, leaving the sleep state, and an operation after leaving the sleep state. The secondary module of the second station receives and decodes the wake-up signal to obtain control information and identity identifier information, and sends the control information and the identity identifier information to the control module. The control module of the second station determines, according to the identity identifier information, whether the second station is the target second station of the wake-up signal, and parses and completes the operation indicated in the control information. With the embodiments of the present application, the combination of control information can be optimized for different scenarios. Through this optimization, network efficiency can be improved, access delay can be shortened, and power saving performance of the terminal can be improved. Illustratively, the movement of the to-be-awoken device and the relevant network access operation are indicated in the wake-up signal with a small number of overheads, so that the primary module of the moved and awoken terminal identifies a mobile state in a short period of time and performs efficient network access; the target working channel is indicated in the wake-up signal, avoiding a behavior of the primary module of the awoken terminal to blindly send and receive on the original working channel; and the wake-up signal indicates the operation in the non-wake-up state, achieving the purpose of updating the information state and avoiding taking the primary module out of the sleep state.

Other aspects can be understood after the drawings and detailed description are read and understood.

BRIEF DESCRIPTION OF DRAWINGS

FIG. 1 is a communication architecture diagram according to an embodiment of the present application;

FIG. 2 is a flowchart 1 of a control information transmission method according to an embodiment of the present application;

FIG. 3 is a flowchart 2 of a control information transmission method according to an embodiment of the present application;

DETAILED DESCRIPTION

Figure 4:
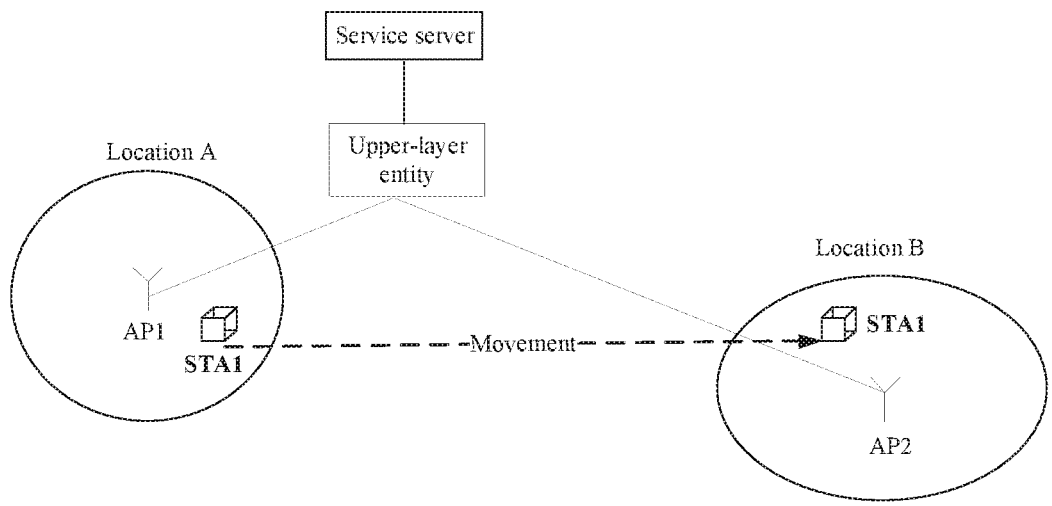
FIG. 4 is a schematic diagram of an application scenario according to an embodiment of the present application.

To provide a more detailed understanding of features and technical content of embodiments of the present application, the implementation of the embodiments of the present application is described below in detail in conjunction with the drawings. The drawings are provided for reference only and are not intended to limit the embodiments of the present application.

In the embodiments of the present application, relevant control information is carried in the wake-up signal so that a sleeping station can quickly identify mobility, and if necessary, can perform a fast network access operation and a state update operation without wake-up. The manner of carrying the control information may be negotiated when the station performs access, or negotiated or updated before the primary module enters a sleep state.

FIG. 1 is a communication architecture diagram according to an embodiment of the present application. As shown in FIG. 1:

a sending end (also referred to as a first station) is responsible for sending and receiving a secondary module signal and a primary module signal;

a receiving end (also referred to as a second station) includes a secondary module, a control module, and a primary module; the secondary module is responsible for receiving and decoding a wake-up signal; the control module parses information received by the secondary module and completes a corresponding operation, which may include configuration of a function of the secondary module according to the negotiated parameter; and the primary module is responsible for the main communication function.

In the embodiments of the present application, the wake-up signal is sent when the sending end needs to perform data communication with the receiving end, and a state of the receiving end is not recorded locally or a current state of the receiving end is recorded as a secondary module working state. The secondary module working state refers to a state in which the primary module cannot communicate normally and needs to rely on the secondary module for receiving information.

FIG. 2 is a flowchart 1 of a control information transmission method according to an embodiment of the present application. The control information transmission method in the example is applied to the first station (that is, the sending end). As shown in FIG. 2, the control information transmission method includes the step described below.

In step 201, a first station sends a wireless signal including control information. The control information is used for instructing a specified second station in a sleep state to perform one or more of following operations: state update, sleep mode transition, leaving the sleep state, and an operation after leaving the sleep state.

In an embodiment of the present application, the wireless signal includes a signal sent to be received by a primary module and a signal sent to be received by a secondary module. The primary module and the secondary module are located at the second station. The signal sent to be received by the secondary module is a wake-up signal, and the wake-up signal is used for instructing the specified second station to complete a specified operation.

In the embodiment of the present application, the wake-up signal includes identity identifier information of a to-be-awoken device, and the identity identifier information of the to-be-awoken device is used for indicating a receiver of the wake-up signal.

In an embodiment of the present application, the identity identifier of to-be-awoken device refers to a single user, or a specified group of users.

In an embodiment of the present application, the wake-up signal may include identity identifiers of a plurality of to-be-awoken devices, and the identity identifiers of the plurality of to-be-awoken devices are used for instructing a plurality of users to complete respective specified operations in a predefined mode.

In an embodiment of the present application, the wake-up signal further includes information of a target working channel, and the information of the target working channel refers to information for determining a working channel of the primary module of the second station.

In an embodiment of the present application, the wake-up signal may further include identity identifier information of a sender. The identity identifier information of the sender is media access control (MAC) address information, part of the MAC address information, or base station subsystem (BSS) color information of the sender, or identifier information capable of identifying an identity of the sender.

In an embodiment of the present application, the wake-up signal further includes information indicating whether a serving access point is replaced. The information indicating whether the serving access point is replaced is used for indicating whether the first station is a serving access point recorded by the second station.

In an embodiment of the present application, the wake-up signal may further include network access control information for indicating whether the second station initiates a network access operation and indicating a type of the initiated network access operation. The network access operation refers to a process in which a user accesses a serving base station or a serving access point, and after the network access operation is completed, the serving base station and the serving access point provide services for the user.

In an embodiment of the present application, the wake-up signal may further include information of a time length for delaying wake-up. The information of the time length is used for instructing the second station to perform an operation of leaving the sleep state after the indicated time length.

In an embodiment of the present application, the wake-up signal may further include control information of an operation after leaving the sleep state. The control information of the operation after leaving the sleep state is used for indicating an operation performed by the second station after leaving the sleep state. The operation is, for example, to wait for information from the sending end or to send information of a predetermined type to the sending end. The predetermined type may refer to position information of the receiving end, measurement information of a sensor, state information of the receiving end, statistical information of the receiving end, and the like.

In an embodiment of the present application, the wake-up signal may further include state update control information for instructing the second station to update a local state or perform sleep mode transition without taking the primary module out of the sleep state. For example, a local register is updated according to the information in the wake-up signal, or a local clock is updated to be synchronized with the clock of the access point, or a sleep state of the primary module of the receiving end is changed.

The update of the local clock refers to that the access point carries timing information in a radio frame. The timing information is used for time synchronization between the power saving module and the access point. The timing information may be independent from timing information of the primary module, and may be a part (lower part) of the timing of the primary module. The timing information for the power saving module is mainly used in a state where the power saving module is alternately turned on and off. In this case, the clocks of the access point and the power saving module need to be synchronized, so that when the power saving module needs to be awoken, the timing of the access point and the power saving module is consistent. The timing information of the power saving module is maintained by the access point.

In an embodiment of the present application, the wake-up signal may further include uplink and downlink indication information for indicating a direction of the wireless signal. The direction is from a station side to an access point or from the access point to the station side.

Here, inconsistency in length of the wake-up identifier of the station and the access point may be supported. For example, the wake-up identifier of the station may be longer than the wake-up identifier of the access point, and then the receiving end, when receiving, may intercept the receiving address and the sending address of the responsive radio frame according to the information. It is assumed that the wake-up identifier of the access point (AP) is 4 bits, and the wake-up identifier of the station (STA) is 16 bits. When the uplink and downlink indication is downlink, the wake-up identifier of the STA serving as the receiving address is placed in front of the wake-up identifier of the AP serving as the sending address. When the uplink and downlink indication is uplink, the wake-up identifier of the AP serving as the receiving address is placed in front of the wake-up identifier of the STA serving as the sending address.

In an embodiment of the present application, the wake-up signal may further include paging area indication information for identifying a paging area where the first station is located.

Here, the paging area may include a range of multiple APs to help the receiving end determine whether to re-access the network. When the station detects that the paging area is not replaced, the primary module may not be taken out of the wake-up state and the network access operation may not be performed, and only when the station detects that the paging area is replaced, the network needs to be accessed.

In an embodiment of the present application, when the first station fails to receive expected information within predetermined time, the method may further include the steps described below.

When the first station is a serving access point of the second station, the wake-up signal is resent; and if the number of retransmissions reaches the first predetermined number of times, it is reported to an upper-layer management system that the second station is inaccessible.

When the first station is not the serving access point of the second station, the wake-up signal is resent; and if the number of retransmissions reaches the second predetermined number of times, it is reported to the upper-layer management system that the second station is inaccessible.

In an embodiment of the present application, when the first station receives expected information within predetermined time, the method may further include the steps described below.

When the first station is a serving access point of the second station, normal communication is performed.

When the first station is not the serving access point of the second station, it is reported to an upper-layer entity that the second station is accessible.

In an embodiment of the present application, the expected information refers to information sent by the second station in response to control information of a wake-up signal, or information of an operation performed by the second station in response to the control information of the wake-up signal. For example, when the network access control information indicates that the receiving end performs the network access operation, the information requesting for network access sent on the expected channel by the receiving end is the expected information of the sending end.

FIG. 3 is a flowchart 2 of a control information transmission method according to an embodiment of the present application. The control information transmission method in the example is applied to the second station (that is, the receiving end). As shown in FIG. 3, the control information transmission method includes the steps described below.

In step 301, a secondary module of a second station receives and decodes a wake-up signal to obtain control information and identity identifier information, and sends the control information and the identity identifier information to a control module.

In step 302, the control module of the second station determines, according to the identity identifier information, whether the second station is a target second station of the wake-up signal, and parses and completes an operation indicated in the control information.

In an embodiment of the present application, the step in which the control module of the second station determines, according to the identity identifier information, whether the second station is the target second station of the wake-up signal may include a step described below.

The control module of the second station parses identity identifier information of a to-be-awoken device in the wake-up signal, and checks whether the identity identifier information of the to-be-awoken device includes identity identifier information of the second station or identity identifier information of a multicast group to which the second station belongs.

In an embodiment of the present application, the method may further include a step described below.

The control module of the second station parses information about whether a serving access point is replaced and identity identifier information of a sender in the wake-up signal, and determines, according to a parsing result, whether the serving access point is replaced.

In an embodiment of the present application, the step in which the control module of the second station parses the information about whether the serving access point is replaced and the identity identifier information of the sender in the wake-up signal, and determines, according to the parsing result, whether the serving access point is replaced may include the steps described below.

If the information about whether the serving access point is replaced does not exist, a receiver compares the identity identifier information of the sender with a locally stored identity identifier of the serving access point. If the identity identifier information of the sender is consistent with the locally stored identity identifier of the serving access point, the serving access point is determined not to have been replaced, and if the identity identifier information of the sender is inconsistent with the locally stored identity identifier of the serving access point, the serving access point is determined to have been replaced.

If the information about whether the serving access point is replaced indicates that the serving access point is not replaced and the identity identifier information of the sender does not exist, the serving access point is determined not to have been replaced.

If the information about whether the serving access point is replaced indicates that the serving access point is not replaced and the identity identifier information of the sender is consistent with the locally stored identity identifier in the second station, the serving access point is determined not to have been replaced.

If the information about whether the serving access point is replaced indicates that the serving access point is not replaced and the identity identifier information of the sender is inconsistent with the locally stored identity identifier in the second station, the second station is determined not to be the target second station of the wake-up signal.

If the information about whether the serving access point is replaced indicates that the serving access point is placed, the serving access point is determined to have been replaced.

In an embodiment of the present application, if the control module of the second station parses the wake-up signal and determines that the wake-up signal comprises uplink and downlink indication information, identity identifier information of a to-be-awoken device and identity identifier information of a sender are parsed according to address lengths of a first station and the second station.

In an embodiment of the present application, if the control module of the second station parses the wake-up signal and determines that the wake-up signal comprises paging area indication information, the control module of the second station compares the paging area indication information with local information to determine whether the second station is located in an original paging area.

In an embodiment of the present application, the method may further include a step described below.

The control module of the second station parses information of a target working channel in the wake-up signal, and when a primary module needs to be taken out of a sleep state, the information of the target working channel is sent to the primary module so that a working channel of the primary module after wake-up is the target working channel.

Alternatively, the control module of the second station parses the information of the target working channel in the wake-up signal, and compares the information of the target working channel with local information. If the information of the target working channel is inconsistent with the local information and when the primary module needs to be taken out of the sleep state, the information of the target working channel is sent to the primary module so that the working channel of the primary module after the wake-up is the target working channel. In an embodiment of the present application, the method may further include the steps described below.

The control module of the second station parses network access control information in the wake-up signal.

If the network access control information instructs to access network, the control module awakes a primary module to take the primary module out of a sleep state. After the primary module is taken out of the sleep state, a network access operation is performed according to a type of the network access indicated by the network access control information. If the network access control information instructs not to access network, no network access operation is performed after the primary module is taken out of the sleep state.

In an embodiment of the present application, the method may further include the steps described below.

The control module of the second station parses state update control information in the wake-up signal, and performs a corresponding operation according to content of the state update control information. For example, a local register is updated according to the information in the wake-up signal, or a local clock is updated to be synchronized with the clock of the access point, or a sleep state of the primary module of the receiving end is changed. The state update control information may also instruct the power saving module to update its local clock to match the clock of the serving access point. The state update control information may also instruct the power saving module to update the register, such as information about whether the serving access point is inaccessible and an update of an address information list of potential pageable access points. The address information list of potential pageable access points refers to that the power saving module considers that although the primary module does not wake up, once the primary module needs to be awoken, the network side may page or awake the power module through the access points in the list. The address list information may be updated according to address information of access points carried in different wake-up signals received. Each piece of address information is deleted unless updated within predetermined time, address information that is not updated for a long time will be deleted, and new address information will be added.

In an embodiment of the present application, the method may further include a step described below.

The control module of the second station parses information of a time length for delaying wake-up in the wake-up signal, and takes a primary module out of a sleep state after a time length indicated by the information of the time length for delaying the wake-up.

In an embodiment of the present application, the method may further include the steps described below.

The control module of the second station parses control information of an operation after wake-up in the wake-up signal.

The control module takes a primary module out of a sleep state, and transmits the control information of the operation after the wake-up to the primary module. After the primary module wakes up, a corresponding operation is performed according to the control information of the operation after the wake-up. Then operation is, for example, to wait for information from the sending end, or to send information of a predetermined type to the sending end. The predetermined type may refer to position information of the receiving end, measurement information of a sensor, state information of the receiving end, statistical information of the receiving end, and the like.

In an embodiment of the present application, the method may further include a step described below.

A primary module of the second station negotiates with a serving access point about a parameter of the secondary module when the primary module is in a sleep state. For example, the channel, the bandwidth, and the modulation and coding scheme of the wake-up signal may be negotiated, and sleep parameters (waking up from sleeping periodically, and whether the secondary module sleeps or is turned off when the primary module works) of the secondary module may also be negotiated.

In an embodiment of the present application, the method may further include a step described below.

The primary module of the second station configures the negotiated parameter of the secondary module to the secondary module and the control module; and when the second station is in a secondary module working state, the secondary module listens to the wake-up signal in a manner required by the parameter.

Alternatively, the primary module of the second station configures the negotiated parameter of the secondary module to the control module, and the control module configures the parameter of the secondary module to the secondary module; and when the second station is in the secondary module working state, the secondary module listens to the wake-up signal in the manner required by the parameter.

In an embodiment of the present application, the method may further include a step described below.

A primary module of the second station sends indication information to a first station before the primary module enters a sleep state, so that the first station learns a time where the primary module of the second station enters the sleep state.

In an embodiment of the present application, the method may further include a step described below.

When a primary module is in a working state and if the secondary module receives the wake-up signal, the secondary module decodes the wake-up signal and sends the decoded wake-up signal to the control module; the control module determines, according to a rule configured by the primary module, whether the control information needs to be sent to the primary module; and when the control information needs to be sent to the primary module, the primary module performs a corresponding operation according to the control information.

Alternatively, when the primary module is in the working state and if the secondary module receives the wake-up signal, the secondary module decodes the wake-up signal and sends the decoded wake-up signal to the control module; the control module sends the control information to the primary module; and the primary module performs the corresponding operation according to the control information.

The control information transmission method provided in the embodiments of the present application is described in detail below in conjunction with the application scenarios.

In the embodiment, a first station and a second station may refer to different communication entities, such as an access point (AP) and an STA (the station may be an AP STA or a non AP STA) in the WLAN technology, or may correspond to a base station and a user in the cellular network. The second station has three modules: a secondary module, a control module and a primary module. The primary module implements all functions required by the communication terminal in the common sense, such as network access authentication, communication, and negotiation of a general sleep mechanism with the AP or the base station. The secondary module is responsible for receiving and decoding a wake-up signal. The control module parses information received by the secondary module and completes the corresponding operation, and may include configuring a function of the secondary module according to the negotiation parameter. The secondary module and the control module listen to a channel during normal sleep or deep sleep of the primary module, and perform operations indicated in the wake-up signal, or take the primary module out of the sleep state and transmit control information to the primary module. The secondary module and the control module are also referred to as power saving modules. The power saving modules have low power consumption during operation, and are in a state of normally on or configured to be in a state of periodically on and off. The primary module has relative high power consumption during operation, and is in an off state or in an extremely low power consumption state most of the time.

The normal sleep refers to that the communication node turns off the sending and receiving modules in order to save power. The sleeping party negotiates with the communication peer about the time to wake up. When the wake-up time is up, the sleeping party actively wakes up to check if any communication needs to be performed, and if the communication peer has a communication demand, information or a notification will be sent at the time the sleeping party wakes up. For example, in the WLAN system, the normal sleep refers to a sleep mechanism defined by IEEE 802.11a, IEEE 802.11b, IEEE 802.11g, IEEE 802.11n, IEEE 802.11ac, IEEE 802.11ah, IEEE 802.11ad, IEEE 802.11ax, and the like. A sleep mechanism in which the wake-up time is pre-negotiated also exists in the cellular network. The deep sleep refers to that the communication node turns off the entire communication module, or turns off most of the power consumption modules, and leaves only extremely low power consumption relative to the entire module to maintain the ability to perform necessary operations when waking up.

The secondary module may listen to the channel not only when the primary module is in deep sleep but also when the primary module is in normal sleep, so that the primary module may be taken out of the sleep state when the peer end has a demand for communication with the primary module. It is not necessary to be limited to the original normal sleep in which the primary module can be awoken only when the primary module wakes up periodically or at a predetermined time. Therefore, the secondary module can help achieve that the primary module does not need to wake up periodically or at a predetermined time during normal sleep, and can also respond in a short time as needed, thereby more easily satisfying the characteristics of power saving and low delay.

In the following embodiments, the AP serves as the first station, and the non AP STA provided with the power saving module serves as the second station. The power saving module is called a wake up receiver/radio (WUR) module in some implementations. The power saving module includes a secondary module and a control module, and the non-AP STA itself except the power saving module is a primary module. The second station is equipped with a WUR module, so is also referred to as a WUR device hereinafter.

In the following embodiments, the first station has a demand for communication with the second station, and as an initiator, the first station awakes the second station to communicate with the first station.

In some applications, the WUR device has a demand for movement that is typically done while the device is in a deep sleep state. When the device moves from the original serving AP to another AP and the background service has a demand for communication with the device, the data packet is first transmitted to the original serving AP, and the original serving AP fails to awake the device by sending a wake-up signal. Then the service AP feeds back the reason for the failure to the upper-layer entity. The upper-layer entity may be an access controller (AC) or another entity responsible for connecting and managing multiple APs in the network deployment, and may include an entity, such as RADIUS, Diameter, etc., responsible for the authentication function, and may also include a dynamic host configuration protocol (DHCP) server responsible for IP address allocation, and the like. In this process, if necessary, the serving AP may also share more information (such as the MAC address of the serving AP, the application identifier (AID) information of the target device, and the key agreement information, etc.) about connection between the device to be awakened and the serving AP to the upper-layer entity to facilitate other APs to awake the target device and make more efficient access.

The upper-layer entity selects, according to the application, the candidate AP of the target area to send a wake-up signal for attempting to awake the target device. The candidate AP sends the wake-up signal in a manner that the target device can identify, for example, the signal carrying the wake-up ID (unicast or group) of the target device is sent in a manner that the target device can identify on a channel on which the target device remains listening.

As shown in FIG. 4, a STA1, which is a WUR device, initially accesses an AP1 and is connected to the server through the upper-layer entity. The STA1 moves out of the AP1 and moves to a range of an AP2 in the deep sleep state. If the AP1 has a demand for communication with the STA1 and the AP1 fails to awake the STA1, the information is reported to the upper-layer entity. The upper-layer entity selects a certain AP to awake, or page the STA1 according to the service characteristics. For example, at a certain moment, the upper-layer entity expects that the STA1 move into the AP2, and then the AP2 is selected to perform the operation of awaking the STA1.

After the primary module of the target device is successfully awoken and if the wake-up signal does not carry any information about network re-access, all the information is still based on the original serving base station after the device resumes the communication function. The information is sent to the original several times. After several failures of sending information to the original AP, the channel is re-scanned, a new AP is found, and the network access process is re-executed. Although this process is feasible, a long time is to be taken, and much information is sent by the primary module, which is not conducive to achieving the purpose of power saving and low delay. The embodiment uses the wake-up signal to carry some control information for helping the target device to more quickly identify whether to move after wake-up, and to identify how to re-access the network more quickly if the AP is replaced, and even to support the process of the network re-access, so that power saving and low delay are implemented more efficiently.

The AP may also send the wake-up signal in the form of broadcast, and the wake-up signal carries information, such as an address identifier and a working channel, about the AP itself for a STA that is to be awoken by the broadcast wake-up signal to determine whether the STA is still within the range of the original AP and whether the network needs to be re-accessed. If the STA is determined to be out of the range of the original AP and the network needs to be accessed, the new AP is quickly accessed.

The secondary module of the STA receives the wake-up signal, decodes the wake-up signal and sends the decoded signal to the control module. The control module determines whether the wake-up signal is sent to the control module itself, parses the control information in the wake-up signal, awakes the primary module according to the state of the primary module, and transmits the control information to the primary module. After the primary module wakes up, a corresponding operation is performed according to the content of the control information.

The wake-up process and the transmission process of control information include the following situations.

When the power saving module receives the wake-up signal and decides to take the primary module out of the sleep state and if the primary module is in the off state or in the extremely low power consumption state and cannot receive the information of the power saving module, the power saving module first starts the primary module, which may be the entire primary module or some sub-modules. When the primary module is turned on until the information of the power-saving module can be received, the power saving module transmits the control information to the primary module.

When the power saving module receives the wake-up signal and decides to take the primary module out of the sleep state and if the primary module is in the sleep state, cannot receive the air interface information and can receive the information of the power saving module, the power saving module takes the primary module out of the sleep state and transmits the control information to the primary module at the same time.

The operation of the power saving module may also be decomposed into the operations of the secondary module and the control module. In the above process, the secondary module is responsible for receiving and decoding the wake-up signal, and the control module is responsible for parsing the control information in the wake-up signal and decides the specific operation according to the content of the control information. The operation refers to that, for example, the primary module is taken out of the sleep state and the control information is transmitted to the primary module; or the primary module is not taken out of the sleep state and only the sleep state is transited to take the primary module from the deep sleep state to a light sleep state; or the primary module is not taken out of the sleep state and only the state record of the power saving module is updated. For example, the state record update includes whether the power saving module is moved out of the range of the original serving station and whether the AP set to be selected is changed.

The process in which the mobile STA needs to be awoken and is awoken by the non-serving base station is described above. The present application may also be applied to the case in which the serving base station awakes the STA.

Embodiment 1

When a sending end needs to perform data communication with a receiving end, a state record of the receiving end does not exist locally, or a current state of the receiving end is recorded as a secondary module working state. The secondary module working state refers to a state in which the primary module cannot communicate normally and needs to rely on the secondary module for receiving information. When an AP is a serving base station of a STA, the AP end has sleep state information of the STA (deep sleep/power saving or normal sleep/power saving). When an AP is not the serving base station of the STA, the AP does not have the state information of the STA, and the upper-layer entity requests the AP to awake the specific STA.

When the AP sends the wake-up signal to the STA and finds that a working channel of the STA before sleeping is different from a current working channel of the AP itself, information of a target working channel of the STA is carried in the wake-up signal. This situation may occur when the original serving AP switches the working channel, or the sending end of the wake-up signal is a new AP and the new AP has a different working channel from the original serving AP. The information of the working channel may be sequence numbers, for example, indicated by 8 bits, of globalized channels and specified in the WLAN standard. Numbers 1 to 11 indicate 11 channels of the 2.407 GHz band.

The information of the working channel may also be sequence numbers of localized channels. For example, the supported working channels reported in the STA capability information are locally numbered. If the STA only supports working in the 2.4 GHz band, 4 bits are needed for the domain value since the number of channels in this frequency band is small.

The information of the working channel may only include a sequence number of a primary working channel, for example, a global or local sequence number of the primary 20 MHz channel, may also include the sequence number of the primary working channel and a sequence number of a secondary channel, may also include the sequence number of the primary working channel and channel bandwidth information, or other methods capable of determining information of the primary channel and the secondary channel to indicate the target working channel.

The power saving module receives the wake-up signal sent to the power saving module itself, parses the target working channel information carried in the control information, awakes the primary module, and transmits the control information to the primary module. The primary module wakes up and configures the working channel to the specified channel.

Or as described above, the primary module is in deep sleep, and the power saving module first performs the operation of taking the primary module out of the sleep state. When a part of the functions of the primary module are started and information of the power saving module can be processed, the power saving module sends the control information to the primary module, and the primary module configures the radio frequency to the required working channel according to the control information.

In addition, the AP may carry its own working channel information, and the STA determines whether the working channel needs to be switched.

In addition, the AP may carry its own working channel information, and the STA does not need to determine the working channel and directly configures the working channel of the primary module as the target working channel.

Embodiment 2

To support movement of a STA, if an upper-layer entity requires an AP to awake or page a STA not belonging to the AP, the AP informs in the wake-up signal or in the paging signal that the STA has moved out of a range of the original serving AP.

The AP indicates identity identifier information of a sender in the wake-up signal.

Or, the AP indicates, in the wake-up signal, information about whether the serving access point is replaced and the identity identifier information of the sender.

Or the AP indicates, in the wake-up signal, information about whether the serving access point is replaced.

The identity identifier information of the sender may be MAC address information, part of the MAC address information, or BSS color information of the sender, or other identifier information capable of identifying an identity of the sender.

The information about whether the serving access point is replaced may be 1 bit for indicating whether the STA is within the range of the original AP.

The secondary module of the receiving end decodes the wake-up signal and sends the control information to the control module. The control module parses at least one of the following information in the wake-up signal: the information about whether the serving access point is replaced, and the identity identifier information of the sender.

If the information about whether the serving access point is replaced does not exist, it is determined whether the service access point is replaced by determining whether the identity identifier information of the sender is consistent with identity identifier information, saved at the receiving end, of a serving AP.

If the information about whether the serving access point is replaced indicates that the serving access point is not replaced and the identity identifier information of the sender does not exist, the serving access point is determined not to have been replaced.

If the information about whether the serving access point is replaced indicates that the serving access point is not replaced and the identity identifier information of the sender is consistent with local information of the receiving end, the serving access point is determined not to have been replaced.

If the information about whether the serving access point is replaced indicates that the serving access point is not replaced and the identity identifier information of the sender is inconsistent with the local information of the receiving end, the receiving end is determined not to be the target receiving end, and the parsing is terminated.

If the information about whether the serving access point is replaced indicates that the serving access point is placed, the serving access point is determined to have been replaced.

When the AP is detected to have been replaced, the control module takes the primary module out of the sleep state. The primary module may perform the subsequent operations specified in advance or decide the subsequent operations, and may also use other information in cooperation. For example, the decision is self-made or an instruction, from the control information, of network access of the STA is received, and then the primary module performs an operation of new access. Or the decision is self-made or an instruction of no network access is received, the STA does not need to access the network, listens to the data packet at the air interface to obtain a new MAC address of a server, and responds with the new MAC address, or the control information carries address information of the AP, and then the primary module may respond with the address. Or the negotiation may also be implemented in a manner that the STA waits for the AP to send information, does not need to initiate the process of accessing the network and only needs to wait to receive data sent by the new AP.

When the AP is detected to have been replaced, state update control information may also be received, the local state of the STA is updated, no access is required, and the primary module may not be taken out of the sleep state.

Embodiment 3

To support movement of a STA, an AP sends a wake-up signal to indicate whether the other party needs to perform the network access operation and the type of network access operation when the network access operation is required.

The power saving module receives the wake-up signal sent to the power saving module itself, parses the network access control information in the wake-up signal, awakes the primary module, and transmits the control information to the primary module.

If the above control information indicates that the network access operation needs to be performed and that the type of the network access operation is a traditional network access authentication process, after the primary module wakes up, the primary module does not attempt to be connected to the original serving AP, directly initiates a new network access process, performs channel scanning, authentication, association and IP acquisition, is connected to its own server, and obtains the data packet or instruction that the original AP did not successfully deliver.

If the above control information indicates that the network access operation needs to be performed and that the type of the network access operation is a fast network access authentication process, the primary module may perform an improved fast network access operation. Fast network access refers to a simplified network access authentication process, such as the fast network access process defined by IEEE 802.11ai. The processes of authentication, association, capability negotiation, key agreement, IP address allocation and the like are all compressed in two frame interactions. In addition, some security-related information is exchanged through the background to make the interaction between the new AP and the target device more reliable. Compared with the dozens of frame interactions in the traditional network access authentication process with at least several hundred milliseconds, two frame interactions are compressed to in the fast network access process with a delay which may be compressed to within 100 milliseconds.

The target working channel information after the primary module wakes up is used in cooperation, and the channel scanning procedure in the above network access process may be omitted, thereby achieving the purpose of a faster access to the network and further saving power.

If the above control information indicates that the network access operation needs to be performed and that the above control information indicates a special network access authentication process, communication between the AP and the STA is not performed through a traditional network access process or a fast network access process but through a new network access process. In general, the new network access process minimizes the original interaction process, and may support a security authentication-free process or a simple security authentication process through the background interaction information. For example, in the first frame interaction, the new AP temporarily pretends to be the original serving AP, uses address encryption information of the original serving AP, and the like, while informs, through the frame, the target device of the fact that the target device has moved to the new AP, and informs the target device of the AID, the address of the new AP, even the encryption information and the like under the new AP. In the subsequent frame interaction, the AID notified by the new AP, the address of the new AP, and the encryption information are used. If the target working channel information after the primary module wakes up is used in cooperation, all the frame interactions may be performed on the working channel of the new AP. Otherwise the first frame interaction is performed on the working channel of the original serving AP and the target device is informed, in the first frame interaction, of information of the work that needs to be switched. The subsequent frame interaction is completed on the working channel of the new AP. The special network access authentication process may also be network access authentication-free. Through the background interaction, the new AP completely replaces functions of the original serving AP, and re-access is not needed for the device side. When the new AP communicates with the moved target device, the address information of the original serving AP is grouped with the AID negotiated with the device (such as when no conflict exists with the AID of the device in the new AP), the encryption key, and even the IP address to perform information interaction. If the above control information indicates that the network access operation does not need to be performed, the primary module wakes up, waits to receive information sent by the new AP, performs subsequent operations, or performs corresponding operations in cooperation with other control information. For example, the operation indication control information after the wake-up state is left indicates information about the primary module waiting for the AP after the wake-up module is left, or instructs the primary module to send a specific predetermined type of information after the wake-up module is left.

Embodiment 4

The AP may achieve the purpose of simultaneously operating multiple users by controlling different wake-up time for multiple STAs. For example, the AP may use orthogonal frequency division multiple access (OFDMA), or multi-user multiple-input multiple-output (MU-MIMO), or OFDMA and MU-MIMO, or another multi-user multiplexing manner to multiplex the uplink or downlink data of multiple users.

The sending end unicasts the wake-up signal to each STA, and the wake-up signal includes information of a time length for delaying wake-up. The secondary module of the STA receives the wake-up signal sent to the secondary module itself, and sends the decoded information to the control module for parsing. The control module detects that the wake-up signal further includes the information of the time length for delaying the wake-up, and then takes the primary module out of a sleep state after the time length indicated by the information of the time length for delaying the wake-up.

If the wake-up signal further includes other control information, such as relevant information about the network access and control information of an operation after the wake-up, the control module further transmits the corresponding control information to the primary module. The primary module wakes up and performs the corresponding operation according to the content of the control information.

Embodiment 5

Figure 5:
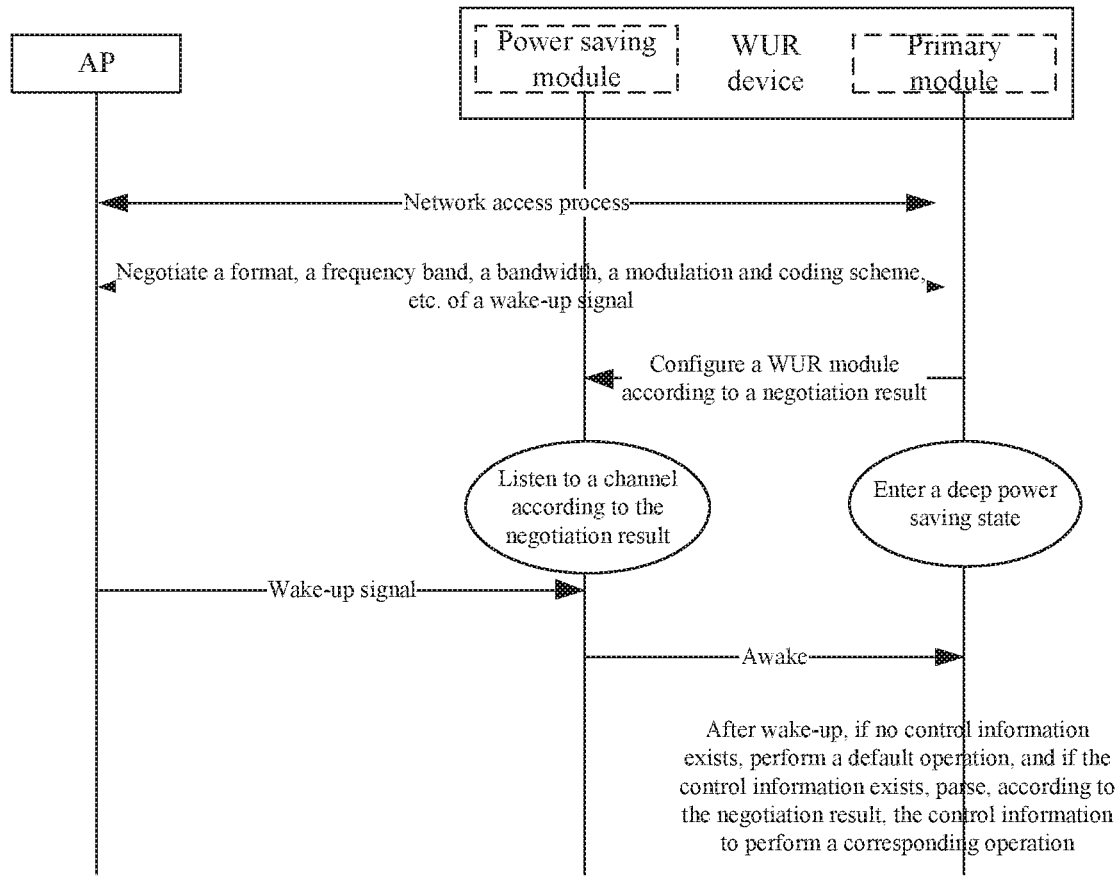
FIG. 5 is a schematic diagram of communication interaction according to an embodiment of the present application.

Referring to FIG. 5, during or after the process of network access, the WUR device negotiates with the serving AP about a parameter of the secondary module when the primary module is in a sleep state. For example, the negotiation includes at least one of: negotiation about a format of the wake-up signal; negotiation about a frequency band and bandwidth, including whether to hop in the specified order, for sending the wake-up signal; negotiation about the modulation and coding scheme of the wake-up signal; and may also include negotiation about the sleep parameter (waking up from sleeping periodically, and whether the secondary module sleeps or is turned off when the primary module works) of the secondary module.

The format of the wake-up signal includes whether to carry specific domains, and a length of these specific domains if the specific domains are carried.

For example, the overhead of an ID of the to-be-awoken device may be negotiated. Since these specific domains are negotiated by both devices, different applications may have different formats of wake-up signals. For example, the overhead of the ID of the to-be-awoken device is determined according to the size of the network.

For example, it is possible to negotiate whether to carry a control information domain. If the information domain is not carried, the negotiation operation further includes the default operation after the primary module wakes up. The serving AP may negotiate different default operations for different WUR devices according to the service types of the WUR devices. For example, the serving base station negotiates with a WUR device 1 that the wake-up signal does not carry control information. The default operation after the primary module of the WUR device 1 wakes up is to send positioning information to the serving base station; and the serving base station negotiates with a WUR device 2 that the wake-up signal does not carry the control information, and the operation after the primary module of the WUR device 2 is to wait for a further indication from the sending end of the wake-up signal. The further indication may include waiting for a downlink multi-user frame, or waiting for scheduling information of an uplink multi-user frame, or waiting to be scheduled, or waiting for the notification or command or the like of the serving base station.

If the control information domain is carried, the content of the control information domain also needs to be negotiated.

Whether to carry the target working channel is negotiated, and if the target working channel is carried, the number of bits and the meaning of the target working channel are negotiated. For example, indications of working channels having different overheads may be global indications or local indications.

Whether to carry the identity information of the sender is negotiated, and if the identity information of the sender is carried, the number of bits and the meaning of the identity information of the sender are negotiated. For example, 48 bits are used to indicate the MAC address of the new AP, or the number of bit overheads between 1 and 48 is used to indicate the identifier of the new AP, BSS color information, or identification information capable of identifying the identity of the sender.

Whether to carry 1-bit information that indicates whether the serving access point (AP) is replaced is negotiated.

Whether to carry the network access control information is negotiated, and if the network access control information is carried, the number of bits and the meaning of the network access control information are negotiated. For example, in the description of the embodiment 3, 1 bit may be used to indicate whether network access is required, or 2 bits may be used to indicate whether network access is required, and a normal network access process, a fast network access process or a WUR-specific network access process (in which some network access steps may be omitted or simplified) is used.

Whether to carry a time length for delaying wake-up is negotiated, and if the time length for delaying the wake-up is carried, the number of bits and the meaning of the time length of delay are negotiated.

Whether to carry control information of an operation after leaving the sleep state is negotiated, and if the control information of the operation after leaving the sleep state is carried, the length of the control information and the meaning represented by each of the values are negotiated. For example, the length of 3 bits represents 8 instructions, "000" represents that the primary module wakes up and then waits to receive information of the AP, "001" represents that the primary module wakes up and then sends positioning information to the AP, "010" represents that the primary module wakes up and then sends the predetermined report type of information to the AP, and "011" represents that the primary module wakes up to perform a predetermined operation, such as turning on or off a certain device or regulating parameters of other devices. In addition, WUR devices of different types of applications may negotiate with the AP about the specific meaning corresponding to the control information set. For example, in one application, "001" represents that the primary module wakes up and then sends the positioning information to the AP, while in another application, "001" represents that the primary module wakes up and then sends a certain type of statistical information of the primary module itself to the AP. In addition, the WUR device may also negotiate with the AP about the control information that is transparent to each other, and after the primary module of the WUR device leaves the sleep mode, the control information is sent to the upper layer, and the upper-layer application responds accordingly.

Whether to carry the state update control information is negotiated, and if the state update control information is carried, the number of bits and the meaning of the state update control information are negotiated. For example, 1 bit is used to indicate sleep mode transition, such as from deep sleep to light sleep or from light sleep to deep sleep; or 1 bit is used to indicate adjustment to deep sleep or light sleep regardless of the existing sleep mode.

It is also possible to negotiate only a size of overhead of certain control information, and whether to carry the corresponding domain is indicated by a dedicated bit in the wake-up or paging information.

Or a small number of bits is used to indicate a combination of the carried information, for example, 2 bits are used to indicate 4 levels.

00 indicates that only the target working channel is carried.

01 indicates that the target working channel and relevant information about the network access operation are carried.

10 indicates that the target working channel and the identity information of the sender are carried.

11 indicates that the wake-up delay time is carried.

A small number of bits may also be used to indicate a fixed combination. Each combination includes the type of control information carried by the radio frame, the position of each type of control information within the frame, and the size and meaning of each type of control information.

After the negotiation is complete, the primary module of the WUR device configures the negotiated parameters of the secondary module to the secondary module and the control module. When the WUR device is in the secondary module working state, the secondary module listens to the wake-up signal in a manner required by the parameter.

Or, the primary module of the WUR device configures the negotiated parameter of the secondary module to the control module, and the control module configures the parameter related to the secondary module to the secondary module. When the WUR device is in the secondary module working state, the secondary module listens to the wake-up signal in the manner required by the parameter.

Before the primary module of the WUR device enters a sleep state, the primary module needs to send information to the sending end, so that the sending end can know a time where the primary module of the WUR device enters the sleep state.

When the primary module is in the working state, the secondary module receives the wake-up signal, decodes the wake-up signal and sends the decoded wake-up signal to the control module, the control module determines, according to a rule configured by the primary module, whether the decoded wake-up signal needs to be sent to the primary module, and the primary module determines subsequent operations.

Or when the primary module is in the working state, the secondary module receives the wake-up signal, decodes the wake-up signal and sends the decoded wake-up signal to the control module, the control module sends the control information to the primary module, and the primary module determines subsequent operations.

After the power saving module receives the wake-up signal and if the wake-up signal is detected to be sent to the power saving module itself, the power saving module awakes the primary module and transmits the control information to the primary module.

The primary module receives the control information transmitted by the power saving module, parses the control information and performs corresponding operations.

Embodiment 6

The embodiment describes how the control information in the above embodiments is carried in a wake-up or paging message.

Figure 6:
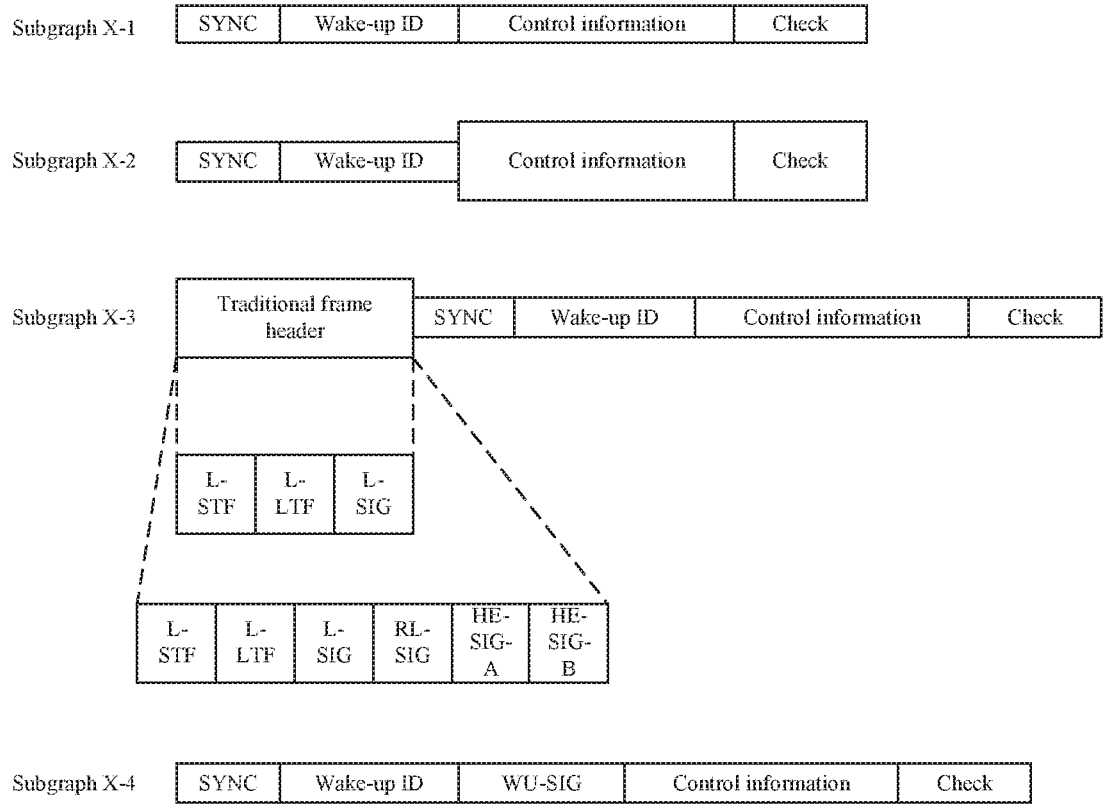
FIG. 6 is an information structure diagram according to an embodiment of the present application.

Referring to FIG. 6, a sub-graph X-1 is a schematic diagram of a wake-up or paging message. The wake-up or paging message includes synchronization, a wake-up ID, control information, and check information. The check information is for the wake-up ID and the control information.

The wake-up ID domain may also have independent check information.

A part included in the control information is a result negotiated by the sending end and the receiving end of the embodiment 5. Different STAs with different capabilities and different applications may have different results, but for each transmission and reception, both communication parties have a clear understanding of what content is carried in the control information, and the length and corresponding meaning of one or more contents.

An operating frequency of the wake-up or paging information may be the same as an operating frequency of the primary module system, and resources may be multiplexed for the signals on the operating band of the primary module and the wake-up or paging information in a time division, frequency division, space division or code division manner.

The operating frequency of the wake-up or paging information may also be different from the operating frequency of the primary module system, and is a dedicated resource with respect to the operating band of the primary module.

In the wake-up or paging information frame structure, the synchronization, the wake-up ID, the control information and the check information may all use a narrower bandwidth with respect to the bandwidth of the primary module.

A sub-graph X-2 illustrates an example of wake-up or paging information in which one or more parts may be sent by using different bandwidths. The synchronization and the wake-up ID may use a lower bandwidth to save power consumption of the WUR, while the control information and the check information parts may use a larger bandwidth to increase the information transmission rate.

A sub-graph X-3 illustrates that the wake-up or paging information may be behind a traditional frame header. The traditional frame header may refer to a frame header, such as only including three parts of L-STF, L-LTF, and L-SIG, or further including RL-SIG, HE-SIG-A and HE-SIG-B in 802.11ax, in one or more protocol versions in the traditional WLAN. These domains are mainly used for communication of the primary module. The WUR receiving end for wake-up or paging information only concerns the synchronization and subsequent content in the wake-up signal.

A sub-graph X-4 illustrates an example of wake-up or paging information including a signaling indication. WU-SIG is physical layer signaling, and indicates a method for parsing domains behind the WU-SIG in the wake-up or paging information.

The WU-SIG includes a length of the part behind the WU-SIG in the wake-up or paging information.

The WU-SIG may also include a modulation manner of the part behind the WU-SIG in the wake-up or paging information.

The WU-SIG may also include a bandwidth of the part behind the WU-SIG in the wake-up or paging information.

The WU-SIG may also include a rate of the part behind the WU-SIG in the wake-up or paging information.

The WU-SIG may also include an index indicating a combination of all of the above information.

Figure 7:
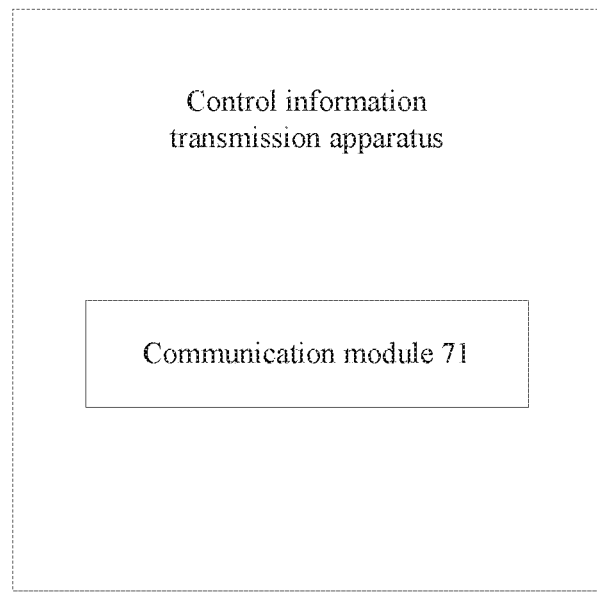
FIG. 7 is a schematic diagram 1 of a control information transmission structure according to an embodiment of the present application.

FIG. 7 is a structural diagram 1 of a control information transmission apparatus according to an embodiment of the present application. The control information transmission apparatus in the example is applied to a first station (that is, sending end). As shown in FIG. 7, the apparatus includes a communication module 71.

The communication module 71 is configured to send a wireless signal comprising control information. The control information is used for instructing a specified second station in a sleep state to perform one or more of following operations: state update, sleep mode transition, leaving the sleep state, and an operation after leaving the sleep state.

In an embodiment, the wireless signal includes a signal sent to be received by a primary module and a signal sent to be received by a secondary module. The primary module and the secondary module are located at the second station. The signal sent to be received by the secondary module is a wake-up signal, and the wake-up signal is used for instructing the specified second station to complete a specified operation.

In an embodiment, the wake-up signal includes identity identifier information of a to-be-awoken device, and the identity identifier information of the to-be-awoken device is used for indicating a receiver of the wake-up signal.

In the embodiment, the identity identifier of the to-be-awoken device refers to a single user, or a specified group of users.

In an embodiment, the wake-up signal may include identity identifiers of a plurality of to-be-awoken devices, and the identity identifiers of the plurality of to-be-awoken devices are used for instructing a plurality of users to complete respective specified operations in a predefined mode.

In an embodiment, the wake-up signal further includes information of a target working channel, and the information of the target working channel refers to information for determining a working channel of the primary module of the second station.

In an embodiment, the wake-up signal may further include identity identifier information of a sender. The identity identifier information of the sender is MAC address information, part of the MAC address information, or BSS color information of the sender, or identifier information capable of identifying an identity of the sender.

In an embodiment, the wake-up signal further includes information indicating whether a serving access point is replaced. The information indicating whether the serving access point is replaced is used for indicating whether the first station is a serving access point recorded by the second station.

In an embodiment of the present application, the wake-up signal may further include network access control information for indicating whether the second station initiates a network access operation and indicating a type of the initiated network access operation. The network access operation refers to a process in which a user accesses a serving base station or a serving access point, and after the network access operation is completed, the serving base station and the serving access point provide services for the user.

In an embodiment, the wake-up signal may further include information of a time length for delaying wake-up. The information of the time length is used for instructing the second station to perform an operation of leaving the sleep state after the indicated time length.

In an embodiment, the wake-up signal may further include control information of an operation after leaving the sleep state. The control information of the operation after leaving the sleep state is used for indicating an operation performed by the second station after leaving the sleep state.

In an embodiment, the wake-up signal may further include state update control information for instructing the second station to update a local state or perform sleep mode transition without taking the primary module out of the sleep state.

In an embodiment, the wake-up signal may further include uplink and downlink indication information for indicating a direction of the wireless signal. The direction is from a station side to an access point or from the access point to the station side.

In an embodiment, the wake-up signal may further include paging area indication information for identifying a paging area where the first station is located.

In an embodiment, when the first station fails to receive expected information within predetermined time, the communication unit 71 may further be configured to: when the first station is a serving access point of the second station, resend the wake-up signal; and if a number of retransmissions reaches a first predetermined number of times, report to an upper management system that the second station is inaccessible; and when the first station is not the serving access point of the second station, resend the wake-up signal; and if the number of retransmissions reaches a second predetermined number of times, report to the upper management system that the second station is inaccessible.

In an embodiment, when the first station receives expected information within predetermined time, the communication unit 71 may further be configured to: when the first station is a serving access point of the second station, perform normal communication; and when the first station is not the serving access point of the second station, report to an upper entity that the second station is accessible.

In an embodiment, the expected information may refer to information sent by the second station in response to control information of a wake-up signal, or information of an operation performed by the second station in response to the control information of the wake-up signal.

It should be understood by those skilled in the art that implementation of functions of one or more modules in the control information transmission apparatus illustrated in FIG. 7 may be understood with reference to the relevant description of the foregoing control information transmission method. The functions of the one or more modules in the control information transmission apparatus illustrated in FIG. 7 may be implemented by one or more programs running on a processor or may be implemented by one or more logic circuits.

Figure 8:
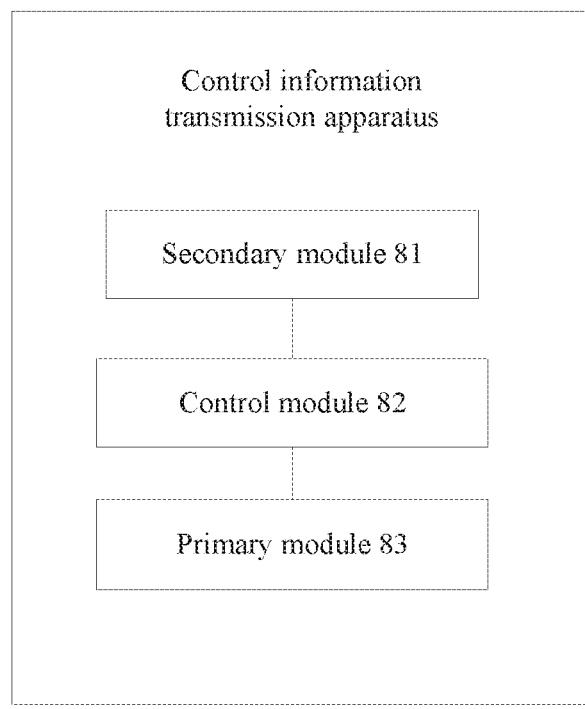
FIG. 8 is a schematic diagram 2 of a control information transmission structure according to an embodiment of the present application.

FIG. 8 is a structural diagram 2 of a control information transmission apparatus according to an embodiment of the present application. The control information transmission apparatus in the example is applied to a second station (that is, receiving end). As shown in FIG. 8, the apparatus includes a secondary module 81 and a control module 82.

The secondary module 81 is configured to receive and decode a wake-up signal to obtain control information and identity identifier information, and send the control information and the identity identifier information to a control module 82.

The control module 82 is configured to determine, according to the identity identifier information, whether the second station is a target second station of the wake-up signal, and parse and complete an operation indicated in the control information.

In an embodiment, the control module 82 may be configured to parse identity identifier information of a to-be-awoken device in the wake-up signal, and check whether the identity identifier information of the to-be-awoken device includes identity identifier information of the second station or identity identifier information of a multicast group to which the second station belongs.

In an embodiment, the control module 82 may be configured to parse information about whether a serving access point is replaced and identity identifier information of a sender in the wake-up signal, and determine, according to a parsing result, whether the serving access point is replaced.

In an embodiment, the control module 82 may be configured to determine, according to the parsing result, whether the serving access point is replaced in the following manners.

If the information about whether the serving access point is replaced does not exist, a receiver compares the identity identifier information of the sender with a locally stored identity identifier of the serving access point. If the identity identifier information of the sender is consistent with the locally stored identity identifier of the serving access point, the serving access point is determined not to have been replaced, and if the identity identifier information of the sender is inconsistent with the locally stored identity identifier of the serving access point, the serving access point is determined to have been replaced.

If the information about whether the serving access point is replaced indicates that the serving access point is not replaced and the identity identifier information of the sender does not exist, the serving access point is determined not to have been replaced.

If the information about whether the serving access point is replaced indicates that the serving access point is not replaced and the identity identifier information of the sender is consistent with the locally stored identity identifier in the second station, the serving access point is determined not to have been replaced.

If the information about whether the serving access point is replaced indicates that the serving access point is not replaced and the identity identifier information of the sender is inconsistent with the locally stored identity identifier in the second station, the second station is determined not to be the target second station of the wake-up signal.

If the information about whether the serving access point is replaced indicates that the serving access point is placed, the serving access point is determined to have been replaced.

In an embodiment, the control module 82 may be configured to: parse information of a target working channel in the wake-up signal, and when a primary module 83 needs to be taken out of a sleep state, send the information of the target working channel to the primary module 83 so that a working channel of the primary module 83 after wake-up is the target working channel; or parse the information of the target working channel in the wake-up signal, compare the information of the target working channel with local information, and if the information of the target working channel is inconsistent with the local information and when the primary module 83 needs to be taken out of the sleep state, send the information of the target working channel to the primary module 83 so that the working channel of the primary module 83 after the wake-up is the target working channel.

In an embodiment, the control module 82 may be configured to parse network access control information in the wake-up signal. If the network access control information instructs to access network, the control module 82 awakes a primary module 83 to take the primary module 83 out of a sleep state; after the primary module 83 is taken out of the sleep state, a network access operation is performed according to a type of the network access indicated by the network access control information; and if the network access control information instructs not to access network, after the primary module 83 is taken out of the sleep state, no network access operation is performed.

In an embodiment, the control module 82 may be configured to parse state update control information in the wake-up signal, and perform a corresponding operation according to content of the state update control information.

In an embodiment, the control module 82 may be configured to parse information of a time length for delaying wake-up in the wake-up signal, and takes a primary module 83 out of a sleep state after a time length indicated by the information of the time length for delaying the wake-up.

In an embodiment, the control module 82 may be configured to parse control information of an operation after wake-up in the wake-up signal; and take a primary module out of a sleep state, transmit the control information of the operation after the wake-up to the primary module 83, and after the primary module 83 wakes up, perform a corresponding operation according to the control information of the operation after the wake-up.

In an embodiment, the apparatus may further include: a primary module 83, which is configured to negotiate with a serving access point about a parameter of the secondary module 81 when the primary module 83 is in a sleep state.

In an embodiment, the primary module 83 may be configured to configure the negotiated parameter of the secondary module 81 to the secondary module 81 and the control module 82. When the second station is in a secondary module 81 working state, the secondary module 81 listens to the wake-up signal in a manner required by the parameter. Alternatively, the primary module 83 configures the negotiated parameter of the secondary module 81 to the control module 82. The control module 82 configures the parameter of the secondary module 81 to the secondary module 81, and when the second station is in the secondary module 81 working state, the secondary module 81 listens to the wake-up signal in the manner required by the parameter.

In an embodiment, the apparatus may further include: a primary module 83, which is configured to send indication information to a first station before the primary module 83 enters a sleep state, so that the first station learns a time where the primary module 83 of the second station enters the sleep state.

In the embodiment, when a primary module 83 is in a working state and if the secondary module 81 receives the wake-up signal, the secondary module 81 decodes the wake-up signal and sends the decoded wake-up signal to the control module 82; the control module 82 determines, according to a rule configured by the primary module 83, whether the control information needs to be sent to the primary module 83; and when the control information needs to be sent to the primary module, the primary module 83 performs a corresponding operation according to the control information.

Alternatively, when the primary module 83 is in the working state and if the secondary module 81 receives the wake-up signal, the secondary module 81 decodes the wake-up signal and sends the decoded wake-up signal to the control module 82; the control module 82 sends the control information to the primary module 83; and the primary module 83 performs the corresponding operation according to the control information.

It should be understood by those skilled in the art that implementation of functions of one or more modules in the control information transmission apparatus illustrated in FIG. 8 may be understood with reference to the relevant description of the foregoing control information transmission method. The functions of the one or more modules in the control information transmission apparatus illustrated in FIG. 8 may be implemented by one or more programs running on a processor or may be implemented by one or more logic circuits.

In addition, a computer-readable medium is further provided in the embodiments of the present application, is configured to store transmission programs of control information. When executed by a processor, the transmission programs implement the steps of the control information transmission method provided in any aspect described above.

It should be understood by those skilled in the art that the embodiments of the present application may be provided as methods, systems and computer program products. Therefore, the present application can take the form of a hardware embodiment, a software embodiment, or a combination of software and hardware embodiments. In addition, the present application may take the form of a computer program product implemented on one or more computer-usable storage media (including, but not limited to, a disk memory and an optical memory) that includes computer-usable program codes.

The present application is described with reference to at least one of flowcharts and/or block diagrams of methods, apparatus (systems) and computer program products according to the embodiments of the present application. It should be understood that computer program instructions implement at least one of each flow and block in at least one of the flowcharts and block diagrams, and flows, or blocks, or a combination of flows and blocks in at least one of the flowcharts or block diagrams. These computer program instructions can be provided to a general-purpose computer, a special-purpose computer, an embedded processor or a processor of another programmable data processing device to produce a machine so that instructions executed by a computer or the processor of another programmable data processing device produce a means for implementing functions specified in at least one of: one or more flows in the flowcharts and one or more blocks in the block diagrams.

These computer program instructions can also be stored in a computer-readable memory which can direct the computer or another programmable data processing device to operate in a particular manner so that the instructions stored in the computer-readable memory produce a manufactured product including an instructing means. The instructing means implements the functions specified in at least one of: one or more flows in the flowcharts and one or more blocks in the block diagrams.

These computer program instructions can also be loaded onto the computer or another programmable data processing device so that a series of operations or steps are performed on the computer or another programmable device to produce processing implemented by the computer. Therefore, instructions executed on the computer or another programmable device provide steps for implementing the functions specified in at least one of: one or more flows in the flowcharts or one or more blocks in the block diagrams.

It should be understood by those skilled in the art that functional modules or units in all or part of the steps of the method, the system and the apparatus disclosed above may be implemented as software, firmware, hardware and appropriate combinations thereof. In the hardware implementation, the division of functional modules or units mentioned in the above description may not correspond to the division of physical components. For example, one physical component may have multiple functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only exemplary embodiments of the present application and are not intended to limit the scope of the present application.

INDUSTRIAL APPLICABILITY

With the control information transmission method and apparatus is provided in the embodiments of the present application, the combination of control information can be optimized for different scenarios. Through this optimization, network efficiency can be improved, access delay can be shortened, and power saving performance of the terminal can be improved.

What is claimed is:

1. A control information transmission method, comprising:

sending, by a first station, a wireless signal comprising control information, wherein the control information is used for instructing a specified second station in a sleep state to perform at least one operation of a group consisting of: state update, sleep mode transition, leaving the sleep state, and an operation after leaving the sleep state;

wherein the wireless signal comprises a wake-up signal;

wherein the wake-up signal comprises network access control information for indicating whether the second station initiates a network access operation and indicating a type of the initiated network access operation; and the network access operation refers to a process in which a user accesses a new serving base station or a new serving access point, and after the network access operation is completed, the new serving base station and the new serving access point provide services for the user;

wherein the wake-up signal further comprises information indicating whether a serving access point is replaced, and the information indicating whether the serving access point is replaced is used for indicating whether the first station is a serving access point recorded by the second station;

wherein the network operation comprises:

the new serving base station or the new serving access point temporarily pretends to be an original serving base station or an original serving access point accessed by the second station in a first frame interaction with the second station, performs the first frame interaction on a working channel of the original serving base station or the original serving access point, and informs the second station of information that the second station has moved to the new serving base station or the new serving access, and of a working channel of the new serving base station or the new serving access point; and in each frame interaction after the first frame interaction, the new service base station or the new access point performs frame interaction with the second station on the working channel of the new service base station or the new access point to complete the network access operation.

2. The control information transmission method of claim 1, wherein the wireless signal comprises a signal sent to be received by a primary module and a signal sent to be received by a secondary module, wherein the primary module and the secondary module are located at the second station; wherein the signal sent to be received by the secondary module is the wake-up signal, and the wake-up signal is used for instructing the specified second station to complete a specified operation.

3. The control information transmission method of claim 2, wherein the wake-up signal comprises identity identifier information of a to-be-awoken device, wherein the identity identifier information of the to-be-awoken device is used for indicating a receiver of the wake-up signal.

4. The control information transmission method of claim 3, wherein the identity identifier of the to-be-awoken device refers to a single user, or a specified group of users.

5. The control information transmission method of claim 2, wherein the wake-up signal further comprises information of a target working channel, wherein the information of the target working channel refers to information for determining a working channel of the primary module of the second station.

6. The control information transmission method of claim 2, wherein the wake-up signal further comprises information of a time length for delaying wake-up, and the information of the time length is used for instructing the second station to perform an operation of leaving the sleep state after the indicated time length.

7. The control information transmission method of claim 2, wherein the wake-up signal further comprises control information of an operation after leaving the sleep state, and the control information of the operation after leaving the sleep state is used for indicating an operation performed by the second station after leaving the sleep state.

8. The control information transmission method of claim 2, wherein the wake-up signal further comprises state update control information for instructing the second station to update a local state or perform sleep mode transition without taking the primary module out of the sleep state.

9. The control information transmission method of claim 2, wherein the wake-up signal further comprises paging area indication information for identifying a paging area where the first station is located.

10. A control information transmission method, comprising:

receiving and decoding, by a secondary module of a second station, a wake-up signal to obtain control information and identity identifier information, and sending the control information and the identity identifier information to a control module; and determining, by the control module of the second station and according to the identity identifier information, whether the second station is a target second station of the wake-up signal, and parsing and completing an operation indicated in the control information;

wherein the control information transmission method further comprising:

parsing, by the control module of the second station, network access control information in the wake-up signal; and in response to determining that the network access control information instructs to access network, awaking, by the control module, a primary module to take the primary module out of a sleep state, performing, by the primary module, a network access operation according to a type of the network access indicated by the network access control information after the primary module is taken out of the sleep state; and in response to determining that the network access control information instructs not to access network, performing, by the primary module, no network access operation after the primary module is taken out of the sleep state;

wherein the control information transmission method further comprises:

parsing, by the control module of the second station, information about whether a serving access point is replaced and identity identifier information of a sender in the wake-up signal, and determining, according to the parsing result, whether the serving access point is replaced;

wherein the network access operation comprises:
  a new serving base station or a new serving access point to be accessed by the second station temporarily pretends to be an original serving base station or an original serving access point accessed by the second station in a first frame interaction with the second station, performs the first frame interaction on a working channel of the original serving base station or the original serving access point, and informs the second station of information that the second station has moved to the new serving base station or the new serving access, and of a working channel of the new serving base station or the new serving access point; and
  in each frame interaction after the first frame interaction, the new service base station or the new access point performs frame interaction with the second station on the working channel of the new service base station or the new access point to complete the network access operation.

11. The control information transmission method of claim 10, wherein if the control module of the second station parses the wake-up signal and determines that the wake-up signal comprises paging area indication information, the control module of the second station compares the paging area indication information with local information to determine whether the second station is located in an original paging area.

12. The control information transmission method of claim 10, further comprising:
  parsing, by the control module of the second station, state update control information in the wake-up signal, and performing a corresponding operation according to content of the state update control information.

13. The control information transmission method of claim 10, further comprising:
  parsing, by the control module of the second station, information of a time length for delaying wake-up in the wake-up signal, and taking a primary module out of a sleep state after a time length indicated by the information of the time length for delaying the wake-up.

14. The control information transmission method of claim 10, further comprising:
  parsing, by the control module of the second station, control information of an operation after wake-up in the wake-up signal; and
  taking, by the control module, a primary module out of a sleep state, transmitting the control information of the operation after the wake-up to the primary module, and performing, by the primary module, a corresponding operation according to the control information of the operation after the wake-up after the primary module wakes up.

15. A control information transmission apparatus, applied to a first station and comprising:
  a processor; and
  a memory for storing instructions executable by the processor,
  wherein the processor is configured to send a wireless signal comprising control information, wherein the control information is used for instructing a specified second station in a sleep state to perform at least one operation of a group consisting of: state update, sleep mode transition, leaving the sleep state, and an operation after leaving the sleep state;
    wherein the wireless signal comprises a wake-up signal;
    wherein the wake-up signal comprises network access control information for indicating whether the second station initiates a network access operation and indicating a type of the initiated network access operation; and the network access operation refers to a process in which a user accesses a new serving base station or a new serving access point, and after the network access operation is completed, the new serving base station and the new serving access point provide services for the user;
    wherein the wake-up signal further comprises information indicating whether a serving access point is replaced, and the information indicating whether the serving access point is replaced is used for indicating whether the first station is a serving access point recorded by the second station;
    wherein the network operation comprises:
      the new serving base station or the new serving access point temporarily pretends to be an original serving base station or an original serving access point accessed by the second station in a first frame interaction with the second station, performs the first frame interaction on a working channel of the original serving base station or the original serving access point, and informs the second station of information that the second station has moved to the new serving base station or the new serving access, and of a working channel of the new serving base station or the new serving access point; and
      in each frame interaction after the first frame interaction, the new service base station or the new access point performs frame interaction with the second station on the working channel of the new service base station or the new access point to complete the network access operation.

16. A control information transmission apparatus, applied to a second station and comprising:
  a processor; and
  a memory for storing instructions executable by the processor,
  wherein the processor is configured to implement the control information transmission method of claim 10.

* * * * *